United States Patent [19]
Chapman

[11] Patent Number: 5,678,771
[45] Date of Patent: Oct. 21, 1997

[54] CHEMICAL DISTRIBUTION SYSTEM

[75] Inventor: John A. Chapman, Wahoo, Nebr.

[73] Assignee: Valmont Industries, Inc., Valley, Nebr.

[21] Appl. No.: 634,933

[22] Filed: Apr. 19, 1996

[51] Int. Cl.⁶ .................................................. B05B 3/00
[52] U.S. Cl. ................................ 239/727; 239/99
[58] Field of Search ..................... 239/96, 99, 450, 239/727

[56] References Cited

U.S. PATENT DOCUMENTS

| | | | |
|---|---|---|---|
| 3,777,573 | 12/1973 | Alinari | 73/432 R |
| 3,991,939 | 11/1976 | Maclay | 239/63 |
| 4,015,366 | 4/1977 | Hall, III | 47/1 R |
| 4,176,791 | 12/1979 | Cattaneo et al. | 239/99 X |
| 4,186,880 | 2/1980 | Jacobi et al. | 239/177 |
| 4,277,026 | 7/1981 | Garvey | 239/127 |

(List continued on next page.)

OTHER PUBLICATIONS

"PC Computer Control of Residential Irrigation Systems", Bob Galbreath–Proceedings from the Irrigation Assn. 1991 Int'l. Expo. & Tech. Conf.

"Chemigation Research Update in Georgia", Laurence D. Chandler, Proceedings from the Irrigation Assn. 1991 Int'l. Expo. & Tech. Conf.

"Chemigation Research in Texas" Wm. M. Lyle & James P. Bordovsky Proceedings from the Irrigation Assn. 1991 Int'l Expo. Tech. Conf.

(List continued on next page.)

*Primary Examiner*—Andres Kashnikow
*Assistant Examiner*—Steven J. Ganey
*Attorney, Agent, or Firm*—Zarley, McKee, Thomte Voorhees & Sease; Dennis L. Thomte

[57] ABSTRACT

A chemical distribution system for use with a mobile irrigation system comprising a liquid chemical supply line vertically adjustably supported on the irrigation system and which is in operative communication with a pressurized source of liquid chemical. A liquid chemical distribution line is positioned beneath the chemical supply line between each pair of the drive towers for the irrigation system and which is in fluid communication with a remotely controlled, electrically operated solenoid valve which is in fluid communication with a chemical supply line. A plurality of spaced-apart emitter valves, having a sprinkler associated therewith, are provided on each of the distribution lines with the associated solenoid valve being operated by a control for activating selective distribution lines whereby liquid chemical may be applied to preselected portions of the area over which the irrigation system moves. An adjustable hydraulic accumulator is associated with each of the emitter valves to meter the amount of liquid chemicals being applied to the field.

7 Claims, 6 Drawing Sheets

U.S. PATENT DOCUMENTS

| | | | |
|---|---|---|---|
| 4,396,149 | 8/1983 | Hirsch | 239/63 |
| 4,397,421 | 8/1983 | Schram | 239/177 R |
| 4,507,910 | 4/1985 | Thornley et al. | 56/10.2 |
| 4,662,563 | 5/1987 | Wolfe, Jr. | 239/1 |
| 4,763,836 | 8/1988 | Lyle et al. | 239/69 |
| 4,795,099 | 1/1989 | Wolfbauer et al. | 239/733 |
| 4,917,304 | 4/1990 | Mazzei et al. | 239/64 |
| 4,961,531 | 10/1990 | Nel | 239/1 |
| 5,048,755 | 9/1991 | Dodds | 239/64 |
| 5,074,468 | 12/1991 | Yamamoto et al. | 234/69 |
| 5,222,324 | 6/1993 | O'Neall et al. | 47/1.7 |
| 5,246,164 | 9/1993 | McCann et al. | 239/11 |
| 5,255,857 | 10/1993 | Hunt | 239/731 |
| 5,279,068 | 1/1994 | Rees et al. | 47/1.7 |
| 5,299,413 | 4/1994 | Gale | 56/10.2 |
| 5,348,226 | 9/1994 | Heiniger et al. | 239/1 |

OTHER PUBLICATIONS

"Chemical Management Through Sprinkler Irrigation Systems" Harold R. Duke, Date Unknown.

"Controlling Center Pivot Sprinklers for Experimental Water Application", Dale F. Heermann, Harold R. Duke & Rome H. Mickelson & Dennis C. Kincaid, 1974.

"Evaluation of Crop Water Stress Under Limited Irrigation", Dale Heermann & Harold Duke, 1978.

"Variable Water Application With Linear Systems", C.W. Fraisse, D.F. Heermann & H.R. Duke, 1993.

"Intergrating Field Grid Sense System With Direct Injection Technology", D.G. Ollila, J.A. Schumacher & Donell P. Froehlich, 1990.

"Spatially Variable Sprinkler Irrigation Chemical Application", H.R. Duke, Brad Carnahan, G.W. Buchleiter & D.F. Heermann, 1994.

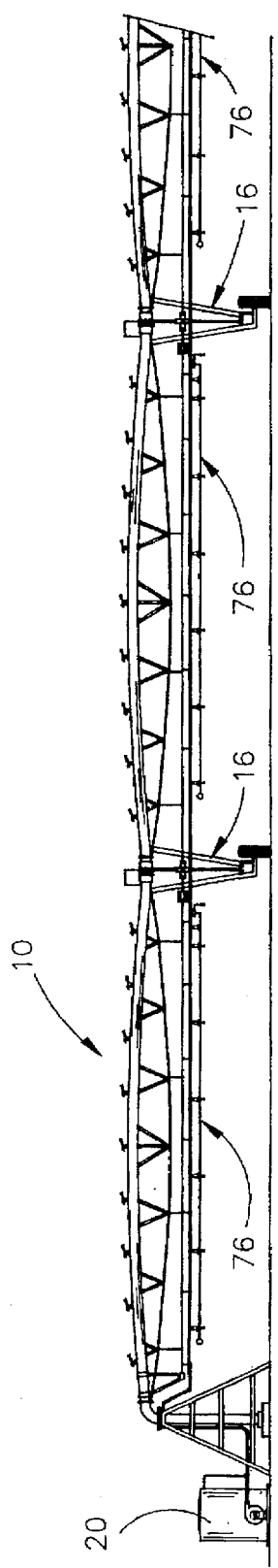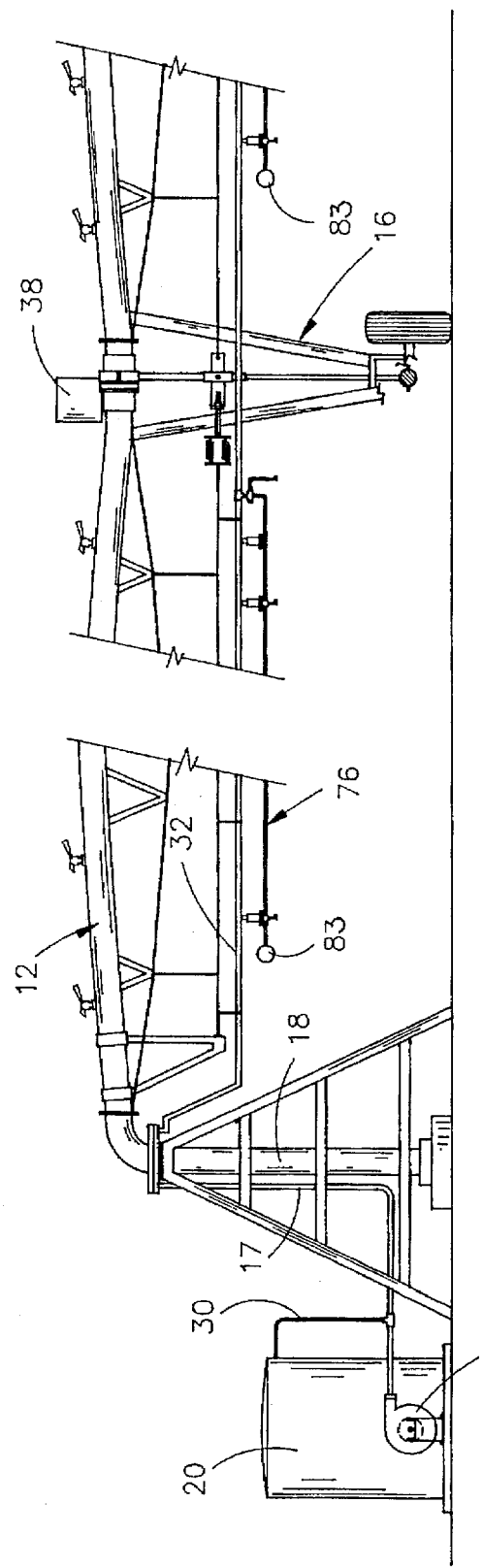
FIG. 2
FIG. 3

CHEMICAL DISTRIBUTION SYSTEM

BACKGROUND OF THE INVENTION

1. Field of the Invention

This invention relates to a chemical distribution system and more particularly to a chemical distribution system which may be mounted on a self-propelled irrigation system so that liquid chemical solutions may be applied to preselected portions of the area over which the irrigation system moves.

2. Background of the Invention

Self-propelled irrigation systems are in wide use throughout various parts of the world to supplement inadequate rainfall and provide the necessary supply of water to grow crops. Most of the self-propelled irrigation systems utilize an elongated pipeline system to transfer water from a water source to the field. There are various kinds of designs such as center-pivot units, linear systems, etc., as is known in the art, and those generally have a main supply line which moves through the field as the water is applied to the land.

It is often desirable, and even necessary, to supply additives including fertilizers to enhance the growth of crops in what otherwise may be a dry, mineral-poor soil. It is often desirable, and even necessary, to supply fungicides, insecticides, herbicides, etc. to the crops.

In U.S. Pat. No. 3,326,232, an apparatus is described for injecting liquid fertilizer into the water being supplied to the crop. Although systems of the type described in U.S. Pat. No. 3,326,232 have met with some success, many problems were encountered with apparatuses of this type. For example, the well being used to supply water to the irrigation system sometimes became contaminated with the fertilizer. Further, the fertilizer could only be applied when the crop was being irrigated. A further disadvantage of the apparatuses such as disclosed in U.S. Pat. No. 3,326,232 is that the fertilizer had to be applied in a continuous wedge-shaped pattern from the center pivot to the outermost drive tower. Yet another disadvantage of such prior art apparatuses is that they could not be used to apply certain chemicals other than fertilizers, since the irrigation water would wash off or dilute the insecticide, fungicide, herbicide, etc.

In U.S. Pat. No. 4,337,786, a variable rate fertilizer injection system is disclosed. Although the invention of U.S. Pat. No. 4,337,786 may have represented an advance in the method of applying fertilizers to crops, the system disclosed therein likewise suffered many of the same disadvantages as that of U.S. Pat. No. 3,326,232.

Yet another type of apparatus for applying water and chemicals to a field is disclosed in U.S. Pat. No. 5,246,164. Although the apparatus of U.S. Pat. No. 5,246,164 is believed to represent yet another advance in the art, it is believed that the system of the patent does not provide the precise metering of chemicals which is deemed necessary in the industry. Further, the apparatus of U.S. Pat. No. 5,246,164 does not provide a satisfactory means of vertically adjustably mounting the sprinkler heads so as to efficiently apply the chemicals to the growing crops without drift of the chemicals. Additionally, in the apparatus of the '164 patent, the same sprinkler heads are utilized for the distribution of water and chemicals.

Inasmuch as it is desirable to be able to selectively apply chemicals to particular portions of the field, the prior art devices simply do not permit the same. For example, in a particular field, the soil types may vary throughout the field which may require that different amounts of fertilizer be applied to different types of soil. Further, insect infestations may only occur in certain portions of the field and the prior art systems simply do not permit selected portions of the field to be treated.

SUMMARY OF THE INVENTION

In accordance with a preferred embodiment, a system is disclosed which overcomes the problems of the prior art and meets the described needs for a liquid chemical injection system which may be associated with a self-propelled irrigation system such as a center-pivot system, a linear system, etc. In the self-propelled irrigation system with which the instant invention is employed, a primary water supply pipe is supported by a plurality of spaced-apart drive towers adapted to move the primary water supply pipe over the field. A liquid chemical supply line is vertically adjustably supported on the irrigation system and is in operative communication with a pressurized source of liquid chemical. A liquid chemical distribution line is positioned beneath the chemical supply line between each pair of drive towers and is in operatively fluid communication with a remotely controlled, electrically operated solenoid valve which is in fluid communication with the chemical supply line. A plurality of spaced-apart emitter valves, having a sprinkler associated therewith, are provided on each of the distribution lines with the associated solenoid valve being operated by a control means for activating selected distribution lines whereby liquid chemical may be applied to preselected portions of the area over which the irrigation system moves. An adjustable hydraulic accumulator is associated with each of the emitter valves to achieve the precise adjustable metering of liquid chemicals to the field regardless of differences in ambient temperatures, chemical temperatures or the spacing between the emitter valves.

It is therefore a principal object of the invention to provide a self-propelled irrigation system having a plurality of liquid chemical distribution lines mounted thereon which are in operative communication with a liquid chemical supply line which is in communication with a source of liquid chemical and wherein selected distribution lines may be activated to apply the liquid chemical to preselected portions of the field over which the irrigation system moves.

Yet another object of the invention is to provide a system of the type described which utilizes an adjustable hydraulic accumulator which is associated with each of the emitter valves.

Still another object of the invention is to provide a system of the type described which also could be adapted to permit the variable rate application of irrigation water from the system.

Yet another object of the invention is to provide a system of the type described which includes a vertically adjustable support means for the chemical supply line and the chemical distribution lines.

Yet another object of the invention is to provide a system of the type described which may be mounted on a movable irrigation system without extensive modification thereof.

These and other objects will be apparent to those skilled in the art.

BRIEF DESCRIPTION OF THE DRAWINGS

FIG. 2 is a partial side view of the system of FIG. 1;

FIG. 3 is a partial side view of a portion of the system;

DESCRIPTION OF THE PREFERRED EMBODIMENT

Figure 1:
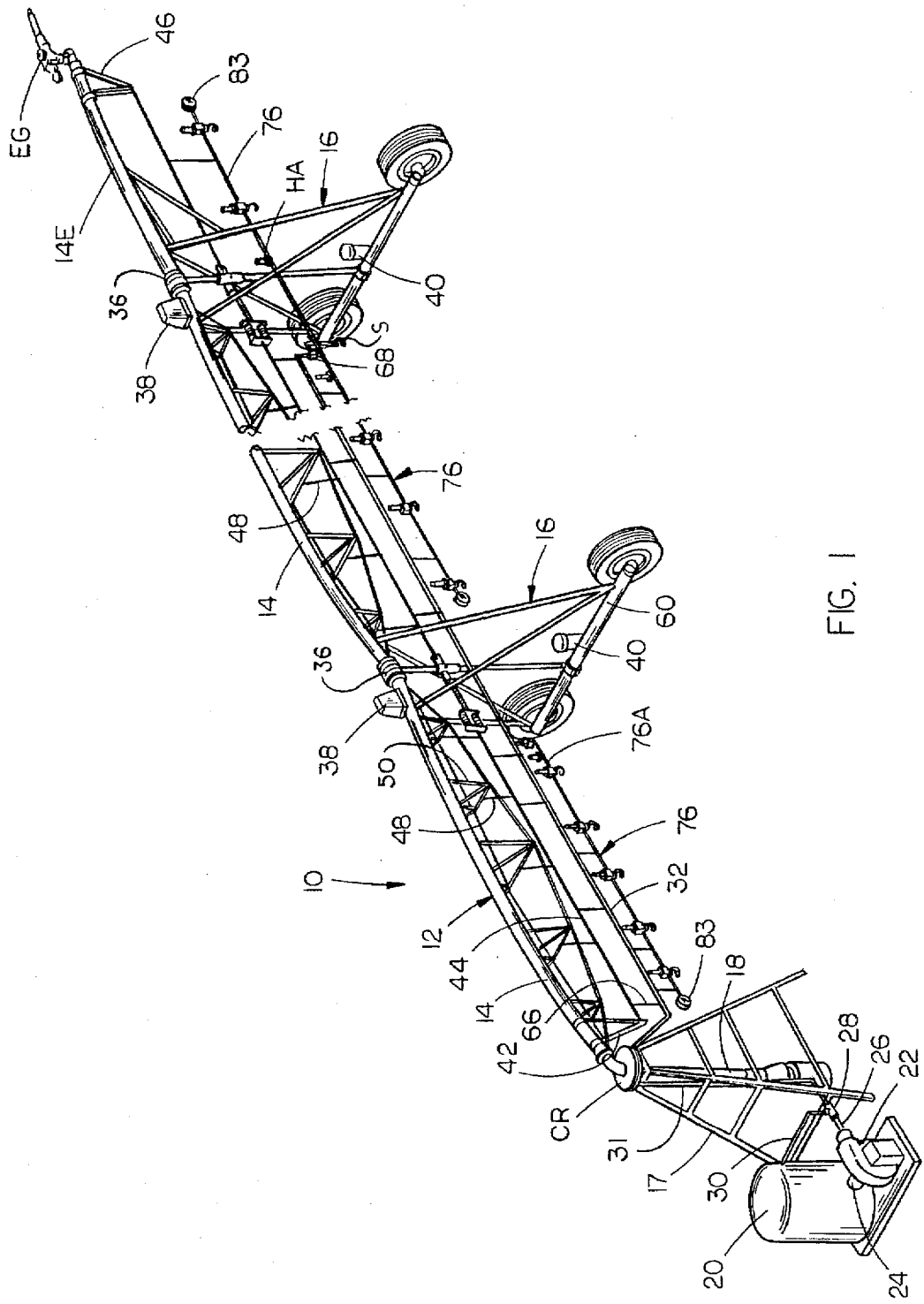
FIG. 1 is a partial perspective view of a conventional self-propelled irrigation system of the center-pivot type wherein the means for applying liquid chemical to preselected areas is associated therewith.

In the drawings, the numeral 10 refers to a typical center-pivot irrigation system including a main water supply line 12 comprised of a plurality of pipe sections 14 joined together and supported by a plurality of drive towers 16. Line 12 extends outwardly from a center pivot structure 17 including a pipe 18 which is connected to a well or water supply. Each of the pipe sections 14 would include spaced-apart sprinklers thereon which have not been shown for purposes of clarity. The drive towers 16 are propelled in conventional fashion so that the system revolves around the center pivot structure 17 to deliver irrigating water to the crop beneath the system. It should be noted that although the system to be described hereinafter for applying liquid chemicals to the crops or field is ideally suited for use with a center-pivot structure such as described hereinbefore, the system is also suited for use with those irrigation systems commonly referred to as linear systems.

The numeral 20 refers to a conventional chemical tank preferably having a capacity of approximately 600 gallons. Tank 20 is designed to contain liquid chemicals or chemical solutions. The numeral 22 refers to a conventional pump which is operatively connected to tank 20 by means of pipe 24. Pipe 26 extends from pump 22 and is operatively connected to a pressure relief valve 28. Pressure relief valve 28 is connected to tank 20 by return line or pipe 30.

The numeral 31 refers to a chemical line which extends from valve 28 to a chemical collector ring CR which has a liquid chemical supply line 32 extending therefrom along the length of the irrigation system and which is supported beneath the pipe sections 14, as illustrated in the drawings, and as will be described hereinafter. Preferably, the liquid chemical supply line 32 would include flexible joints provided thereon, adjacent each drive tower 16, to permit the line 32 to flex as the various towers move into alignment and out of alignment with respect to each other and move upwardly and downwardly with respect to one another. The collector ring CR is associated with line 32 at the center pivot to enable the line 32 to move around the center pivot as the system operates. As seen in FIG. 2, the main water supply pipe 12 includes a plurality of conventional flexible joints 36 provided therein.

The numeral 38 refers to a conventional tower box located at each drive tower and which is conventionally associated with the alignment system for the tower. When one section of the system moves out of alignment with respect to another section, the tower box 38 is actuated to actuate the drive motor 40 on the associated tower 16. Tower box 38 includes a conventional repeating timer (not shown) which is actuated when the drive motor 40 is running.

Figure 5:
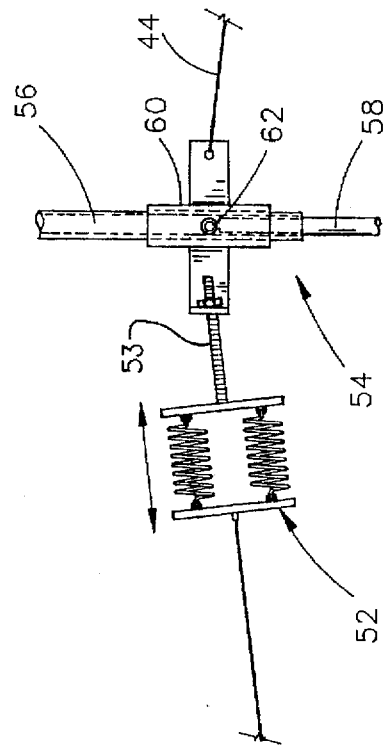
FIG. 5 is a view similar to FIG. 4, but which illustrates the manner in which the chemical supply line support compensates for elevational differences between adjacent towers.
Figure 4:
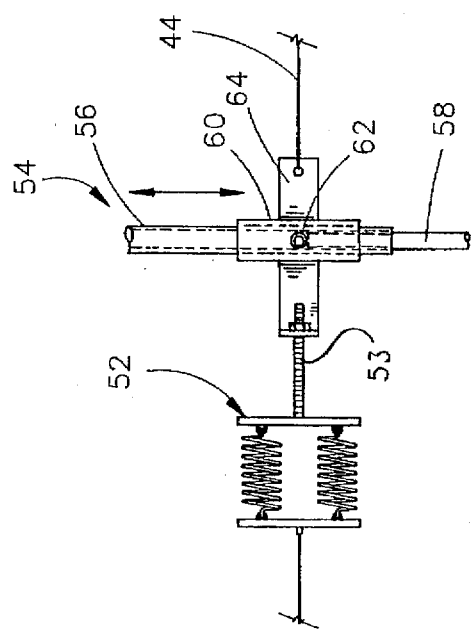
FIG. 4 is a partial elevational view of the adjustable means for supporting the chemical supply line and distribution lines on the irrigation system.
Figure 6:
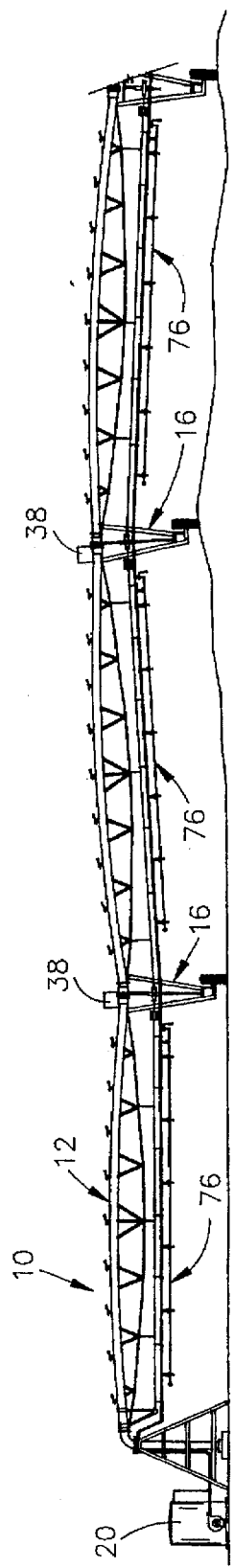
FIG. 6 is a partial side view of the system which is similar to that shown in FIG. 1, but which illustrates certain of the drive towers being disposed at different elevations.

Support or anchor 42 is preferably secured to the innermost pipe section 14 and extends downwardly therefrom (FIG. 1 ) for supporting one end of a wire 44. Support or anchor 46 is preferably secured to the outermost pipe section 14 and extends downwardly therefrom (FIG. 1 ) for supporting the other end of the wire 44. A plurality of ropes 48 or the like extend downwardly from the truss rods 50 for supporting wire 44 along the length thereof. A plurality of adjustable spring assemblies 52 are provided along the length of wire 44 to take up the variations in the length of the wire 44 which are caused by the system crossing uneven terrain, as seen in FIG. 6. As seen in FIGS. 4 and 5, an adjustment bolt 53 extends from the spring assembly 52.

Located at each tower 16 is a vertically adjustable post assembly 54 designed to fit any center-pivot system. Post assembly 54 includes an upper post 56 which has its upper end secured or clamped to the pipe section 14 thereabove. Post assembly 54 also includes a lower post 58 which has its lower end secured or clamped to the beam 60 of the drive tower 16. The upper end of lower post 58 is slidably received within the lower end of upper post 56 (FIGS. 4, 5). Thus, post assembly 54 is readily adaptable to fit any center-pivot system, regardless of the height thereof. Further, collar 60 is selectively vertically adjustably secured, by means of set screw 62 threadably extending through collar 60, to upper post 54 to permit the wire 44 to be vertically adjusted to accommodate various crop heights and to prevent wind drift of the chemical, if needed. Bracket 64 is welded or otherwise secured to collar 60 for supporting one end of wire 44, and the adjustment bolt 53, as seen in FIGS. 4 and 5. Chemical supply line 32 extends along the length of the system as previously described and is supported from the wire 44 by a plurality of wire ties 66 extending downwardly from wire 44.

An electrically controlled three-way solenoid valve 68 is in fluid communication with the chemical supply line 32 at each drive tower 16 and has an inlet 70, outlet 72, and an exhaust port 74. Valve 68 could be comprised of two two-way valves if so desired. The outlet 72 of each valve 68 is in fluid communication with a distribution line 76 having a plurality of hydraulic accumulators 78 and emitter valves 80 provided along the length thereof in a predetermined spacing. Each emitter valve 80 is in fluid communication with an accumulator 78 and sprinkler 81. The details of the accumulators 78 and emitter valves 80 will be described in greater detail hereinafter. Preferably, a high/low pressure sensor 83 is provided at the terminal end of each distribution line 76. Each of the sensors 83 is operatively connected to the control means for the system to deactivate the supply of chemical to supply line 32 and/or distribution lines 76 if predetermined high or low pressures are present in the line 76 such as would occur if emitters became plugged or if a leak is present, respectively. As seen, distribution line 76 is supported from the supply line 32 by a plurality of wire ties 84 or the like. Line 73 extends from the exhaust port 74 of each valve 68 to a sprinkler S.

Figure 8:
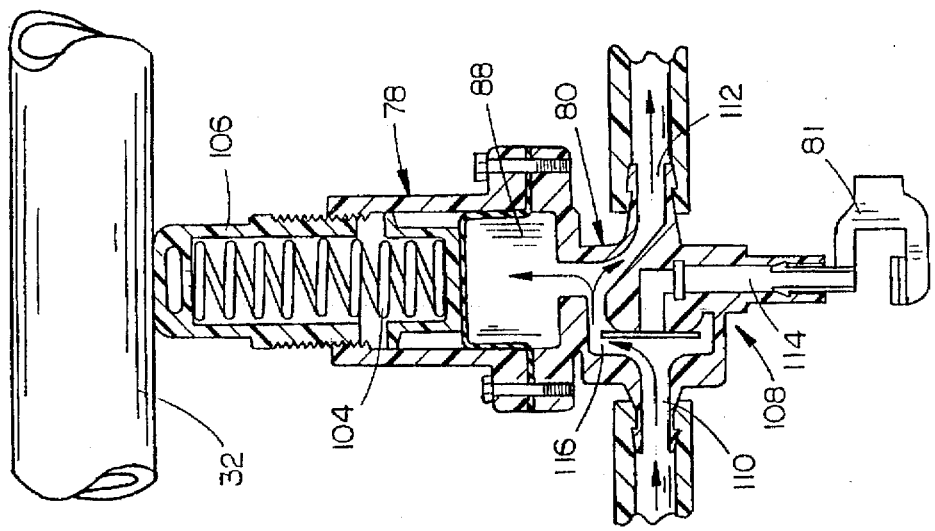
FIGS. 8–10 are views of partial vertical sections of one of the hydraulic accumulators and associated emitters to illustrate the sequence of operation thereof.
Figure 9:
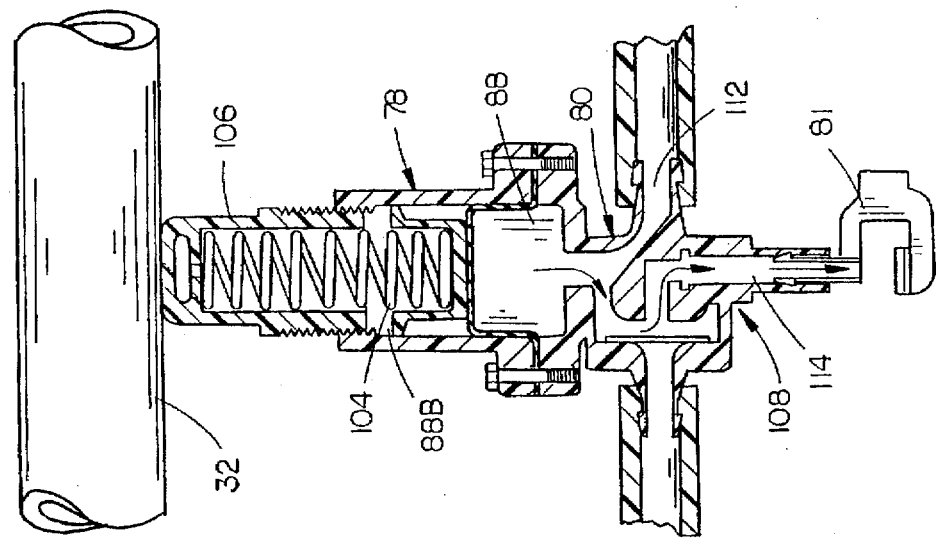
Figure 10:
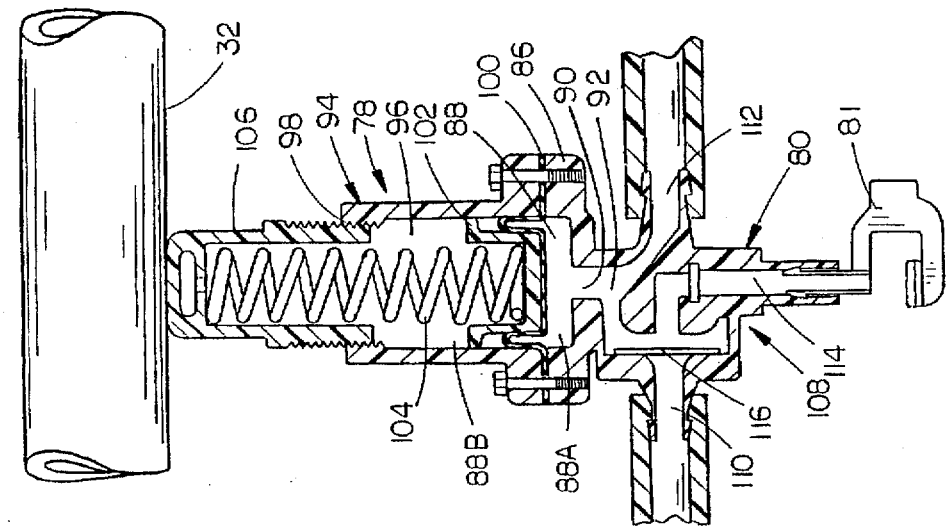
Figure 11:
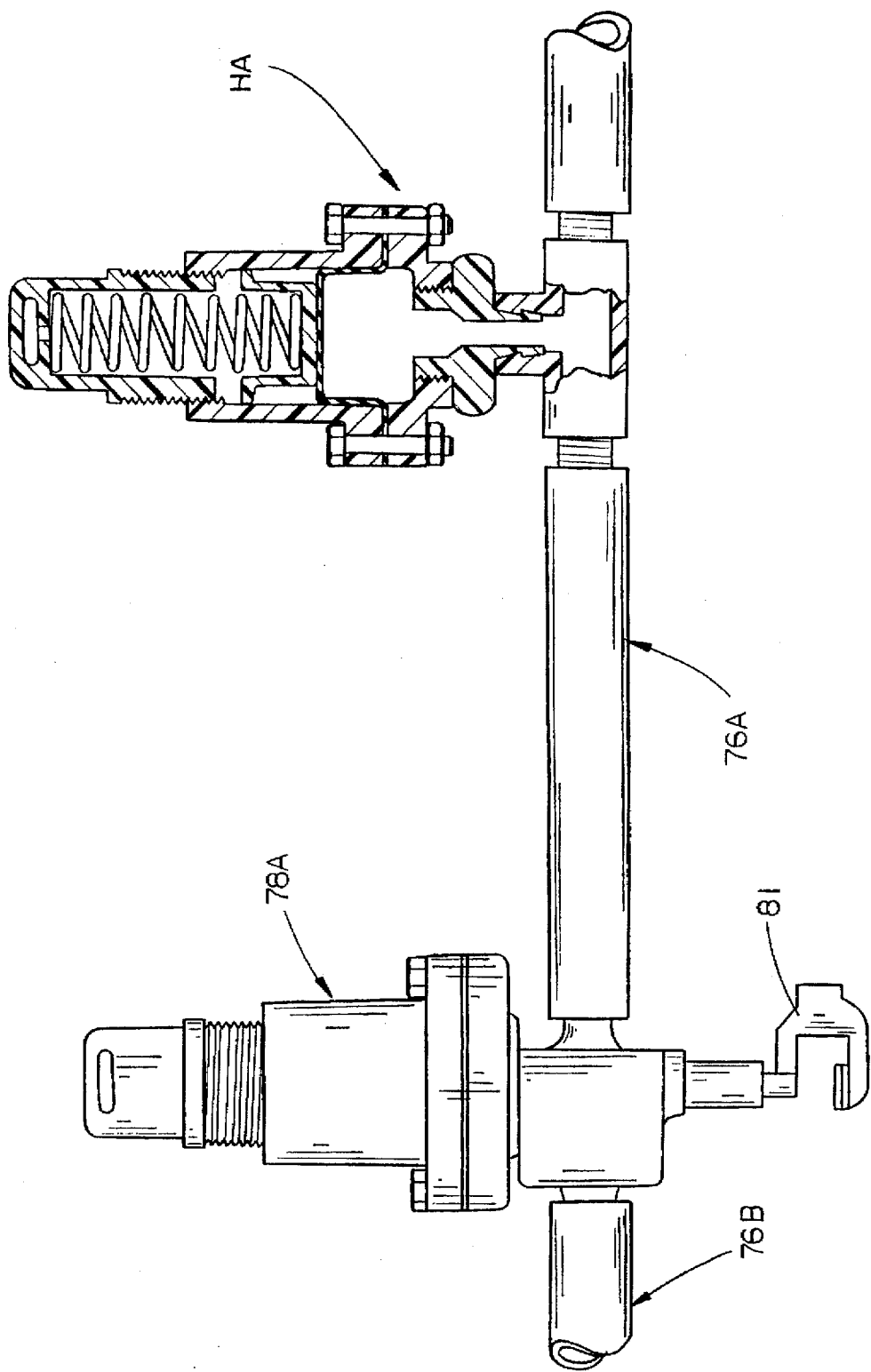
FIG. 11 is a partial side view of a portion of the system with portions thereof cut-away to more fully illustrate the invention.

Each of the hydraulic accumulators 78 includes a lower body 86 having a chamber 88 and an inlet 90. FIGS. 8–10 are for illustrative purposes and illustrate the hydraulic accumulator 78 and emitter 80 as being of one-piece construction. Normally, the hydraulic accumulator 78 would be separately manufactured from the emitter 80, although it is possible that the accumulator and emitter could be manufactured as a single unit. If manufactured as separate units, accumulator 78 would have a nipple portion at its lower end, through which inlet 90 extends, which would be fluidly connected to the port 92 of emitter 80. Further, the port 92 of emitter 80 could be threaded into or onto the nipple at the lower end of accumulator 78 if so desired.

Accumulator 78 also includes an upper body 94, bolted to lower body 86, defining a chamber 96 having an internally threaded open upper end 98. Flexible diaphragm 100 is positioned between the upper and lower bodies 94 and 86 in conventional fashion. Diaphragm 100 divides chamber 88 into a lower chamber portion 88A and an upper chamber portion 88B. Plunger 102 is movably mounted in chamber 96 of upper body 94 and supports the lower end of an adjustment spring 104 therein. An adjustment cap 106 is selectively threadably mounted in the upper end 98 and receives the upper end of spring 104, as seen in FIGS. 8–10. Threadable adjustment of cap 106 with respect to upper body 94 allows some fine-tuning of the chemical distribution from the accumulator 78 to compensate for various spacing adjustments inasmuch as the area covered by the sprinklers on the distribution line varies. Preferably, the cap 106 has adjustment indicia thereon which makes it easy to adjust the same from zero to the maximum limit stop.

The emitter 80 is of the type manufactured by Intertec Corporation, P.O. Box 2247, Lynchburg, Va. 24501, and is described in U.S. Pat. No. 5,249,745. Emitter 80 includes a body 108 having port 92 in communication with inlet 90 of accumulator 78, as previously described. Emitter 80 also includes an inlet port 110, an outlet port 112 and discharge portion 114. As seen in FIGS. 8–10, emitter 80 includes a movable valve 116 which is movable between the first position of FIG. 9 to the second position of FIG. 10. When valve 116 is in the second position of FIG. 10, the liquid chemical flows through inlet 110, into passageway 116, into inlet 90 of accumulator 78 and into port 112. When valve 116 is in the first position of FIG. 9, the liquid chemical in chamber portion 88A will be discharged through the emitter 80 by way of discharge port 114 so that the sprinkler 81 may sprinkle the chemical onto the area being treated. A hydraulic accumulator HA, without emitter, is positioned between each of the valves 68 and the first hydraulic accumulator 78 downstream therefrom. As will be described hereinafter, the hydraulic accumulator HA discharges through the valve 68 and the sprinkler S associated therewith. As seen in FIG. 1, the valve 68 located adjacent the outermost tower 16 not only is in fluid communication with the distribution line 76 extending inwardly therefrom, but also is in fluid communication with the distribution line 76 positioned below the pipe section 14E which supports the end gun EG.

Figure 7:
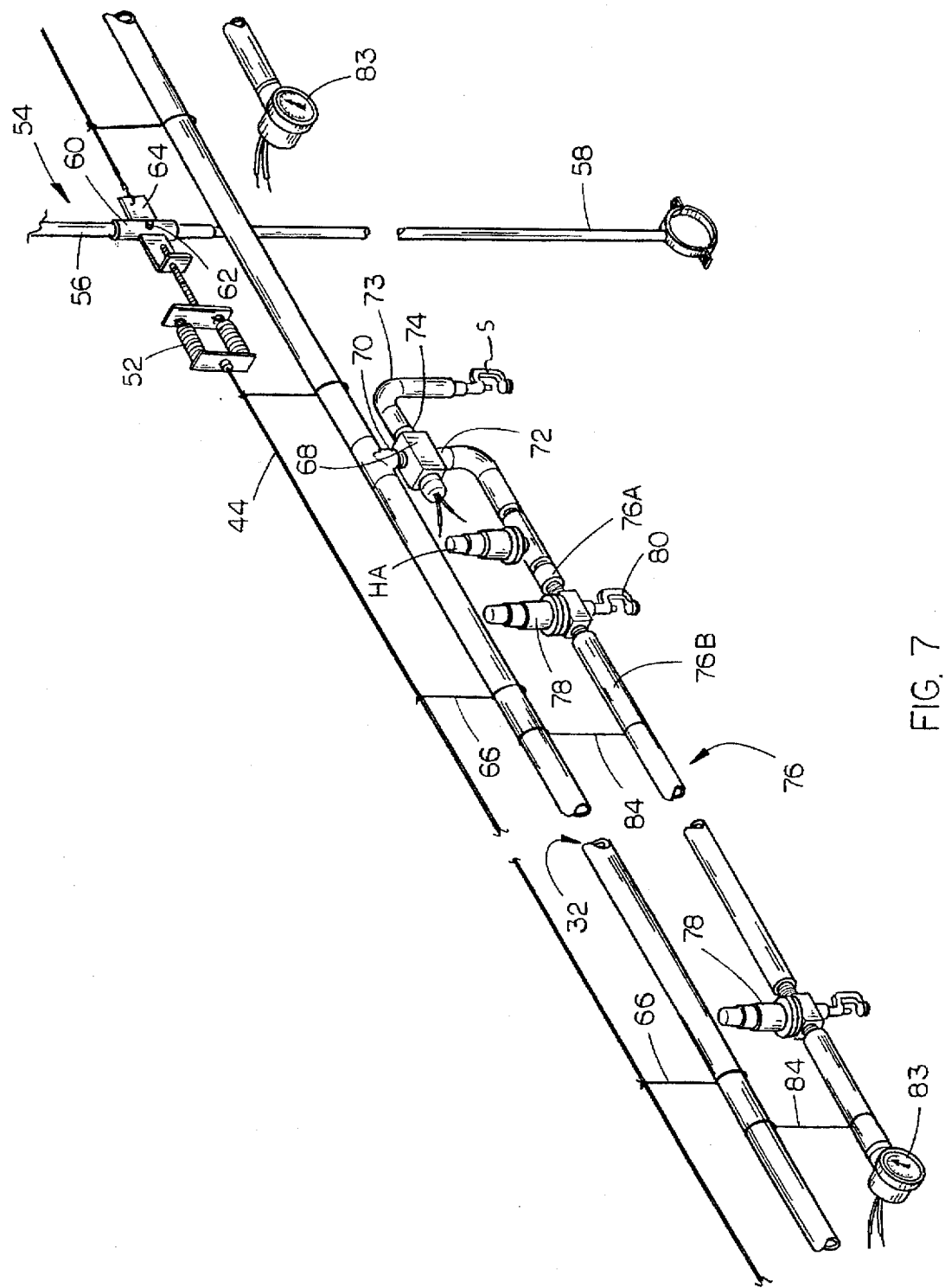
FIG. 7 is a partial perspective view of the system.

The normal operation of the system is as follows. It should be noted that FIGS. 8–10 illustrate the hydraulic accumulator 78 having been rotated 180° from the orientation shown in FIG. 7. In other words, in FIG. 7, liquid chemical is supplied to the accumulators 78 from the right while FIGS. 8–10 illustrate the liquid chemical being supplied to the accumulator 78 from the left.

Normally, the system is fully charged by the pump 22. This means that the pressure in the supply line 32 and in the distribution line 76 are at the same pressure, which preferably would be approximately 45 p.s.i. When the solenoid valve 68 at a particular drive tower 16 is activated by the control system, the valve 68 closes to prevent any material from passing from the supply line 32 to the distribution line 76. At the same time that valve 68 closes the supply port to distribution line 76, valve 68 opens the exhaust port thereof.

The chemical which was trapped or contained within the accumulator HA closest to the valve 68 will be exhausted from the exhaust port 74 of valve 68 and distributed on the crop or ground by sprinkler S. As soon as the pressure in line 76A, between accumulator 78A and valve 68, approaches atmospheric pressure, the first three-way emitter valve 80 in the distribution line 76 shifts to the position illustrated in FIG. 9, so that the chemical in the accumulator discharges through sprinkler 81. When the pressure in line 76B approaches atmospheric pressure, the emitter valve 80 located downstream thereof shifts and discharge occurs. This process is repeated in a progressive sequenced pattern to the end of the particular distribution line. This procedure is similar to that disclosed in U.S. Pat. No. 5,249,745, except that the expandable hose of Bertolotti has been replaced by a rigid hose and a hydraulic accumulator which are not seriously affected by temperature changes.

After the cycle of discharge has occurred in the particular discharge line 76, the valve 68 closes which closes the exhaust port thereof and opens the distribution port which allows recharging of the distribution line. The entire distribution line is filled with little pressurization occurring. As soon as this is accomplished, the filling of the accumulator chamber begins. When the chambers on all of the accumulators 78 on a particular distribution line 76 are filled and the hydraulic accumulator HA is charged, the line is fully charged.

Thus it can be seen that a novel invention has been provided which accomplishes at least all of its stated objectives.

I claim:

1. In combination with a self-propelled irrigation system including an elongated water supply pipe means supported upon a plurality of movable drive towers, comprising:

a liquid chemical supply line supported on said irrigation system and extending substantially the entire length thereof;

said supply line being in operative fluid communication with a source of liquid chemical solution under pressure;

a plurality of elongated chemical distribution lines positioned below said water supply pipe, each of said distribution lines having an inlet end in fluid communication with said chemical supply line;

an electrically operated control valve imposed in the inlet end of each of said distribution lines;

each of said distribution lines having a plurality of spaced-apart emitter valves in fluid communication therewith;

a first hydraulic accumulator in fluid communication with each of said emitter valves;

control means for selectively activating certain of said control valves whereby liquid chemical is supplied to the emitter valves and hydraulic accumulators associated therewith to charge the same and to subsequently cause the discharge of the liquid chemical in the accumulators through the emitter valves associated therewith and onto the area being treated;

and a second hydraulic accumulator, without emitter, fluidly positioned between said control valve and the said first hydraulic accumulator located downstream thereof.

2. The combination of claim 1 wherein each of said accumulators are spring-loaded.

3. The combination of claim 2 wherein said spring-loaded accumulators are selectively adjustable.

4. The combination of claim 1 wherein said second hydraulic accumulator discharges through the exhaust port of said control valve.

5. The combination of claim 1 wherein a support means is provided for supporting said chemical supply line and said distribution lines below said water supply pipe means.

6. The combination of claim 5 wherein said support means includes means for compensating for varying distances between said drive towers as said drive towers propel said water supply pipe means.

7. The combination of claim 1 wherein a high/low pressure sensor is provided on each of said distribution lines which is operatively electrically connected to said control means for deactivating the supply of liquid chemical to said supply line in the event that the pressure sensed by said sensor reaches a high predetermined pressure level or falls to a predetermined pressure level.

* * * * *